UNITED STATES PATENT OFFICE.

GUY DE BECHI, OF PARIS, FRANCE.

TREATMENT OF ORE.

SPECIFICATION forming part of Letters Patent No. 652,072, dated June 19, 1900.

Application filed January 24, 1898. Serial No. 667,795. (No specimens.)

*To all whom it may concern:*

Be it known that I, GUY DE BECHI, a subject of the King of Italy, residing at the city of Paris, France, have invented a certain new and useful Improvement in the Treatment of Ores Containing Intimately-Mixed Copper, Zinc, and Lead, (for which I have received a patent in France, dated July 5, 1897;) and I do hereby declare that the following is a full, clear, and exact description of the invention, which will enable others skilled in the art to which it appertains to make and use the same.

This invention relates particularly to the treatment of ores consisting of complex mixtures of blende, galena, and copper pyrites which it is not generally possible to separate by mechanical treatment. My invention is, however, equally applicable to the treatment of complex ores containing zinc and lead, but not copper. The metallurgical treatment of ores of this kind has heretofore been so expensive as to prevent such treatment coming into practical use. The object of my invention is to overcome this difficulty and to enable nearly the whole of the copper and the greater portion of the zinc and lead to be extracted in a commercially-pure state and in an economical manner.

According to my invention I treat ores of the kind referred to in the following manner: The pulverized ore is mixed with from twenty to forty per cent. of its weight of ordinary salt (chlorid of sodium) or any waste salt rich in alkali metal chlorids or alkali earth metal chlorids, (such as calcium chlorid or magnesium chlorid,) and is then subjected to a chloridizing roasting in furnaces, such as are usually employed in metallurgy for this purpose. The gaseous products formed in the reaction (hydrochloric acid, sulfurous and sulfuric anhydrides, chlorin, &c.,) as also the metallic salts carried off in the process by volatilization, are condensed in suitable towers. The product remaining in the furnaces then comprises the major portion of the zinc and copper in the form of salts soluble in water, a certain quantity of these metals in the form of oxids, and a small quantity of the sulfids of said metals which remain unaltered. The product is treated with a solution of calcium chlorid obtained during the working of this process, as hereinafter described, and is then lixiviated with the acidulated water produced in the above-mentioned condensing-towers. Any sulfuric acid or soluble sulfates contained in such acidulated water or in the roasted ore are decomposed by the addition of calcium chlorid, insoluble sulfate of lime being formed. This acidulated water dissolves the oxids of copper and zinc. This lixiviation of the roasted ore may be carried out at the normal temperature. It is, however, preferable to heat the liquid—for example, by injecting thereinto warm air or a mixture of air and steam. The greater part of the iron present in the ore is thus transformed into an insoluble ferric subsalt.

By the above treatment a solution is obtained which contains the chlorids of copper, zinc, sodium, and calcium, and a certain quantity of free hydrochloric acid. Nearly the whole of the lead contained in the ore and of the sulfates formed in the roasting process remain in the insoluble state with the residue of the lixiviation. The solution is neutraized with lime and is heated to the boiling-point. A quantity of hydrated oxid of zinc, derived from a preceding operation, is then added to the solution, whereupon the copper is precipitated in the form of hydrated oxid of copper, the zinc replacing the copper in accordance with the equation—

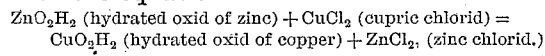

ZnO₂H₂ (hydrated oxid of zinc) + CuCl₂ (cupric chlorid) =
CuO₂H₂ (hydrated oxid of copper) + ZnCl₂, (zinc chlorid.)

This separation of the copper in the state of hydrated oxid may also be effected by adding to the neutral solution a quantity of lime sufficient only to combine with the acid radical of the copper salt, so that the zinc is not precipitated. It is of course understood that the lime may be replaced by sodium hydrate, sodium carbonate, (soda ash,) or like substances that will cause the precipitation of the copper before that of the zinc.

When the whole of the copper has been precipitated, the precipitate of hydrate of copper is separated, by means of a suitable filter, from the solution, and to the filtrate, which now only contains zinc to the exclusion of any other heavy metal, is added the quantity of lime or other alkali necessary for combining with the acid radical of the zinc salt and precipitating the zinc in the form of hydrated oxid of zinc. If no copper is contained in the ore under treatment, the above-mentioned step in my process for the precipitation thereof will of course be omitted. These fractional precipitations are advantageously carried out with a hot solution. They may, however, be performed at the normal temperature, care being taken to maintain the liquid in contact with the reagent by means of an energetic and prolonged agitation. The liquid containing the hydrate of zinc in suspension is filtered, the filtrate then containing only sodium chlorid and calcium chlorid. By partial evaporation of the filtrate the sodium chlorid is recovered and is utilized over again in the process, and a solution is obtained highly charged with calcium chlorid, which solution, as before stated, serves for the treatment of a fresh quantity of roasted ore to eliminate soluble sulfates therefrom.

The hydrated oxid of copper obtained by the treatment above described may be converted into sulfate of copper or reduced to metallic copper in the usual manner. The hydrated oxid of zinc may be reduced to metallic zinc by any appropriate process. Finally the residue of the lixiviation, which contains the lead and all the impurities of the ore, is treated in a cupola-furnace with a suitable flux and metallic lead thus obtained.

What I claim is—

1. The method of treating complex ores for the recovery therefrom of copper, zinc and lead, consisting in subjecting the said ore to a chloridizing roasting, treating the roasted ore with a solution of calcium chlorid to remove soluble sulfates, lixiviating the ore to remove zinc and copper, and fractionally precipitating the zinc and copper from the solution, as hydrated oxids, substantially as described.

2. The method of treating complex ores for the recovery therefrom of copper, zinc and lead, consisting in subjecting the said ore to a chloridizing roasting, treating the roasted ore with a solution of calcium chlorid to remove soluble sulfates, lixiviating the ore to remove zinc and copper, and fractionally precipitating the zinc and copper from the solution as hydrated oxids by successive additions of an alkali metal salt, substantially as described.

3. The method of treating complex ores, consisting in subjecting the ore to a chloridizing roasting, condensing the vapors and gases evolved, treating the roasted ore and the acidulated water containing the condensed vapors and gases with calcium chlorid to precipitate soluble sulfates and sulfuric acid as insoluble calcium sulfate, then lixiviating the ore with the acidulated water to obtain a solution of zinc and copper salts, and fractionally precipitating zinc and copper from the said solution as hydrated oxids by successive additions of lime, substantially as described.

In testimony whereof I sign this specification in the presence of two subscribing witnesses.

G. DE BECHI.

Witnesses:
WILLIAM H. MADDEN,
KÄTCHEN STENZ.